US006548593B2

(12) United States Patent
Merz et al.

(10) Patent No.: US 6,548,593 B2

(45) Date of Patent: Apr. 15, 2003

(54) THIXOTROPIC AGENT

(75) Inventors: Peter W. Merz, Wollerau (CH); Ukiwo Onuoha, Bassersdorf (CH); Shingo Tsuno, Zürich (CH)

(73) Assignee: Sika Schweiz AG, Zurich (CH)

( * ) Notice: Subject to any disclaimer, the term of this patent is extended or adjusted under 35 U.S.C. 154(b) by 0 days.

(21) Appl. No.: 09/846,293

(22) Filed: May 2, 2001

(65) Prior Publication Data

US 2002/0007003 A1 Jan. 17, 2002

(30) Foreign Application Priority Data

May 2, 2000 (EP) ........................................... 00109342

(51) Int. Cl.[7] ............................................... C08L 75/00

(52) U.S. Cl. ....................... 524/507; 524/506; 524/513; 524/589; 526/302

(58) Field of Search ................................ 524/506, 507, 524/513, 589; 526/302

(56) References Cited

U.S. PATENT DOCUMENTS 3,547,848 A * 12/1970 Marsh et al. ............... 106/218
4,522,986 A 6/1985 Short et al.
5,672,652 A 9/1997 Bhat

FOREIGN PATENT DOCUMENTS

| DE | 1805693 | 2/1970 |
|---|---|---|
| DE | 2359929 | 6/1974 |
| EP | 198519 | 2/1986 |
| WO | WO00/37520 | 6/2000 |

* cited by examiner

*Primary Examiner*—David W. Wu
*Assistant Examiner*—William K. Cheung
(74) *Attorney, Agent, or Firm*—Burns, Doane, Swecker & Mathis, L.L.P.

(57) ABSTRACT

New thixotropic agents for the use in cross-linking systems, in particular one-component adhesives and sealants, are described. The thixotropic agents have the advantage that on the one hand they cause only a minor or no increase in viscosity, and on the other hand they do not cause any blead out or migration, respectively. The thixotropic agents of the present invention are based on urea derivatives that usually are present in a concentration of 5 to 50 wt.-%, in particular of 15 to 30 wt.-%, in a preferably reactive carrier material. After the cross-linking of the system, the reactive carrier material is incorporated, preferably into the structure matrix, or interwoven with said structure matrix, respectively, such that it can not diffuse out of the cured material.

20 Claims, No Drawings

THIXOTROPIC AGENT

CROSS REFERENCE TO RELATED APPLICATIONS

This application claims the priority of European patent application no. 00 109 342.6, filed May 2, 2000, the disclosure of which is incorporated herein by reference in its entirety.

FIELD OF THE INVENTION

The present invention relates to new thixotropic agents for viscous systems, in particular for the manufacturing of adhesives and sealants with migration-free properties.

BACKGROUND OF THE INVENTION

For the production of non-sag viscous systems thixotropic agents are used. Inorganic fillers such as e.g. carbon black, aerosil etc. are used. Achieving thixotropy by means of such fillers usually leads to an increase in viscosity and therefore such fillers are primarily considered for the production of compositions for mechanical processing. For the manual processing, e.g. out of a cartridge, the compositions are preferably rendered non-sag by means of organic thixotropic agents since such organic thixotropic agents cause almost no viscosity increase. Organic thixotropic agents are e.g. amide waxes, hydrolyzed castor oils, or urea derivatives that are produced in an inert carrier such as plasticizers, hydrocarbons etc. Such inert carriers, however, have the disadvantage that they can migrate even out of cross-linked systems, such as one-component polyurethane systems, thereby leading to a deterioration of quality. Dependent on the situation, this can have several consequences: For an adhesive, loss of adhesion may result; Substances diffusing out of the composition may cause health problems, a visual deterioration of porous substrates etc.

Thus, the present invention aims at providing new thixotropic agents for adhesives and sealants that overcome the above mentioned drawbacks.

BRIEF SUMMARY OF THE INVENTION

Hence, it is a general object of the invention to provide a thixotropic agent based on at least one urea derivative in a migration-free carrier material.

Another object is a viscous, at least one curable binder comprising system containing a thixotropic agent of the present invention.

Still another object is a method for the production of the thixotropic agent of the present invention.

DETAILED DESCRIPTION OF THE INVENTION

The thixotropic agents of the present invention are—as some thixotropic agents of the state of the art—based on urea derivatives. However, for the production of the thixotropic agents of the present invention a non-migrating carrier is used. Such a carrier is either intermingled or interwoven with the structure matrix after the cross-linking, has pronounced compatibility with the whole system, or is incorporated into the structure matrix and can therefore not diffuse out of the cured material. The carrier material or parts thereof should not show any migration tendency on white cement.

Carrier materials suitable in the scope of the present invention are those that do not show any migration according to the test method specified below: The thixotropic agent, or an adhesive or sealing composition comprising such thixotropic agent, respectively, are applied to white cement in form of beads. After 7 days curing at 23° C. and 50% relative humidity (r.h.), the contact zone of the adhesive bead to the substrate is visually examined for signs of migration. Thixotropic agents or carriers, respectively, that under the above mentioned conditions show no noticeable migration, will be referred to below as non-migrating etc.

The thixotropic agents of the present invention are suitable for any cross-linking system. Such cross-linking systems can be two-component systems that cross-link upon mixing of a binder—also referred to as resin component—with a curing agent. The resin component contains reactive groups such as acrylate groups, epoxy groups, isocyanate groups, silane groups, etc. Possible curing agents are e.g. amino groups or hydroxy groups or sulfur groups comprising compounds, initiators for initiating a polymerization of activated double bonds, water, catalysts, etc. The cross-linkable system can also be a one-component system that can be cured either thermally by air humidity or by radiation such as UV-radiation.

The chemistry for the production of urea derivatives is known (see e.g. DE 1805693) and is preferably based on the reaction of aromatic, monomer diisocyanates (isocyanate monomer), such as 4,4'-diphenylmethylene diisocyanate (=MDI), with an aliphatic amino compound, such as e.g. butyl amine. Since both compounds, the isocyanate as well as the amine, are highly reactive, immediately after the mixing of the components the urea derivative is formed as a solid in the carrier material. In the scope of the present invention, the high reactivity of the two reactants requires a careful choice of process parameters and an optimal selection of the carrier material, preferably a reactive carrier material, in order to exclude or at least minimize undesired side reactions as far as possible. The urea derivative can be present in the carrier material in concentration of 5 to 50% or more, preferably in the range of 15 to 30%, and the content is dependent on the processability of the resulting thixotropic agent.

For the production of the thixotropic agent of the present invention, the influence of water present in the carrier material must be considered in the stoichiometric calculation of the amount of isocyanate monomer, such as MDI, and of the amine compound.

Non reactive carrier materials are long-chain polymers with high affinity for the cross-linkable, or the cross-linked system. Said affinity can possibly be enhanced by suitable substitution, such that migration of the carrier material in the cross-linked system does not occur.

Preferred carrier materials are reactive carrier materials such as polyols, blocked isocyanate polymers (prepolymers terminated with blocked isocyanate groups), silane groups terminated prepolymers and/or acrylate groups comprising polymers.

Preferred polyols are polyols with an OH-value of <28 mg KOH/g or a Mw per OH-group of >2000, respectively, more preferably polyols with an OH-value of <10 mg KOH/g or a $M_W$ per OH-group of >6000, whereby such polyols much preferably are liquid at a temperature of about 20° C.–25° C.

It is also within the scope of the present invention that the carrier material is a mixture of carrier materials with the same or different reactivity, in particular a combination of a prepolymer comprising acrylate groups with a prepolymer on silane basis.

The production of the thixotropic agents of the present invention can be carried out in various ways. Two possible production methods, using illustrative examples for polyol prepolymers, are disclosed below in greater detail. In an analoguous manner, said methods can be applied to blocked isocyanate prepolymers and silane groups terminated prepolymers. The production of thixotropic agents with non-reactive carrier materials is less critical since undesired side reactions are excluded.

In a first method at least one isocyanate monomer is added to a mixture of at least one amine compound and at least one polyol. Another procedure is that at least one isocyanate monomer is dissolved in at least one polyol, and is immediately added to a mixture of at least one amine compound in the same palyol(s), optimally in an equivalent ratio of isocyanate:amine of 1:1. Experiments have shown that the quality of the resulting thixotropic agent is dependent on the OH-value since the isocyanate monomer immediately reacts with the hydroxyl groups of the polyol. A good quality results if the OH-value is below 28 mg KOH/g, preferably below 10 mg KOH/g, or the molecular weight per OH-group is above 2000. in particular above 6000.

Preferably, the polyol is liquid at room temperature, or at about 20 to 25° C., respectively, in order to avoid the costly preheating of the polyol on the one hand, and on the other hand, to avoid a removal of additional heat resulting from the pre-heating step during the exothermic production of the urea derivative. Polyethers are particularly suitable as polyols. If the polyol is a polyethylene glycol, the inventive thixotropic agent can serve as basis for a water swellable sealant.

Mercapto groups comprising compounds are hardly suitable as carrier materials since they are even more reactive towards isocyanate groups than hydroxyl groups and significantly lead to undesired side reactions. In a further embodiment, thixotropic agents of the present invention comprising polyols as carrier material can be reacted with an isocyanate compound such as monomer dilsocyanate compounds, isocyanatomethacrylate, isocyanatoproplsilane etc., whereby said polyol carrier is convened into a binder or into a carrier material terminated with reactive groups, e.g., a carrier material terminated with isocyanate groups.

In a further method for the production of an inventive thixotropic agent, a blocked isocyanate prepolymer is used, in place of the polyol. Such blocked isocyanate prepolymers are e.g. described in Progress in Organic Coatings, 3 (1975) 73–99, or Progress in Organic Coatings, 9(1981) 3–28. Since said blocked isocyanate groups cannot react with the amine, their concentration and therefore their chain length is not critical. A thixotropic agent so produced, is suitable for heat reactive systems, whereby the blocking group is liberated due to the heat treatment, and the deblocked isocyanate group reacts with a H-active compound such as e.g. OH-groups, NH-groups, SH-groups etc. These H-active groups—dependending on the H-active group—may contain additional functional groups such as epoxy groups, silane groups, acrylate groups, etc.

Furthermore, silane groups terminated binders, such as MS-polymer (MS=modified silicone) of Kaneka, or a silane groups terminated polyurethane hybrid prepolymer, can also be used as carrier material. A thixotropic agent of the present invention with silane groups terminated carrier material is preferably used as isocyanate-free system, or in isocyanate-free systems on silane basis. Such prepolymers are e.g. described in the patent documents EP 0 355 426, U.S. Pat. No. 3,627,722, DE 40 29 505, U.S. Pat. No. 5,364,955, EP 0 918 062 and U.S. Pat. No. 5,910,555.

In a further embodiment of the present invention, at least one isocyanate monomer can be dissolved in at least one polymer comprising acrylate groups, and added to at least one amine compound that is dissolved in a silane based prepolymer. Such polymers comprising acrylate groups are e.g. obtained by reaction of prepolymers comprising isocyanate groups with hydroxy(meth)acrylate (see e.g. EP 0 675 144).

It is of course possible and within the scope of the present invention to use one carrier material or mixtures of carrier materials. Such mixtures of carrier materials can comprise materials of the same or different reactivity. All reactivities have to be determined beforehand in order to e.g. reduce undesired side reactions by "diluting" respective reactive groups (see polyols). Side reactions can also be reduced by using an optimized production method, e.g. by using a multi-component mixing device.

It is also within the scope of the present invention to use one isocyanate monomer or a mixture of isocyanate monomers, and one amine or a mixture of amines.

The thixotropic agents of the present invention can be applied either directly as system containing viscous, curable binders, or further binders, as well as other components such as fillers, plasticizers, adhesion promoters, catalysts, UV-stabilizers, and/or usual additives can be added, whereby such additional binders are not limited to the binders described as carrier materials, but can also—depending on the carrier material—comprise binders with reactive groups such as epoxy groups, isocyanate groups, acrylate groups, and/or silane groups. Furthermore, the thixotropic agents of the present invention can comprise a curing component, in particular a latent curing agent that can be activated by humidity and/or heat.

The inventive thixotropic agents of the present invention are particularly suitable because they lead only to an insignificant or no increase in viscosity, and furthermore show no tendency to bleed-out or migrate.

Examples are shown below that are intended to further illustrate the invention, but they are not intended to restrict the scope of the invention in any way.

PRODUCTION OF THE THIXOTROPIC AGENTS

Reference 1 and Examples 1A, 1B, 1C, and 1D

In Table 1 compositions and features of more and less preferred inventive thixotropic agents (produced in a polyol) are listed in comparison to Reference 1 (produced in a plasticizer). Said inventive thixotropic agents are e.g. suitable for the use in a plasticizer-free one-component system on silane basis, or as thixotropic polyol in a two component system on isocyanate basis.

The production was done as follows:

The MDI-flakes were melted in one of the raw materials A1, A2, A3, or A4 (see Table 1) under nitrogen and under slight heating. Immediatly after melting, a mixture of N-butylamine dissolved in one of the raw materials B1, B2, B3 or B4 was added dropwise using a dropping funnel, under nitrogen and with fast stirring. The dropwise addition of the amine diol mixture took two hours and led to a very exothermic reaction, whereby the temperature could be kept at about 120° C. due to intense cooling with ice-water. After the dropwise addition of the amine-diol mixture, the resulting white thixotropic paste was mixed for another 30 minutes. The remaning isocyanate content of the thixotropic paste was determined by titration according to ASTM D 1638. The rheology was determined with a material testing device type Zwick Z2.5/TN 1S as extrusion force (with 3 mm nozzle) at 23° C.

TABLE 1

Comparative results for several thixotropic agents

| Parameter | Ref. 1 | Ex. 1A | Ex. 1B | Ex. 1C | Ex. 1D |
|---|---|---|---|---|---|
| Content of urea adduct [%] | 26 | 26 | 40 | 26 | 26 |
| MDI-flakes [g] | 100 | 100 | 150 | 100 | 100 |
| A1) Polyol (OH-value = 10.5) [g] | | 200 | 150 | | |
| A2) Diisodecyl-phthalate (Exxon) [g] | 200 | | | | |
| A3) Polyol (OH-value = 56) [g] | | | | 200 | |
| A4) Polyol (OH-value = 28.5) [g] | | | | | 200 |
| Mono-butylamine [g] | 58 | 58 | 87 | 58 | 58 |
| B1) Polyol (OH-value = 10.5) [g] | | 242 | 213 | | |
| B2) Diisodecyl-phthalate (Exxon) [g] | 242 | | | | |
| B3) Polyol (OH-value = 56) [g] | | | | 242 | |
| B4) Polyol (OH-value = 28.5) [g] | | | | | 242 |
| Residual isocyanate content [%] | 0.06 | 0.005 | 0.005 | 0.08 | 0.05 |
| Extrusion force, fresh [Newtons] | 300 | 600 | 2300 | 750 | 900 |
| Extrusion force, 1 week, 60° C. | 500 | 750 | not meas-urable | 1300 | 1550 |
| Consistency | pasty/soft | pasty/soft | grainy/hard | inhomoge-neous/soft | inhomoge-neous/soft |

MDI-flakes:. 4,4'-Diphenylmethylene diisocyanate (producer Bayer)
Polyol (OH-value = 10.5): about 12000 g/mole, water content about 0.01% (producer Lyondell)
Polyol (OH-value = 56): about 2000 g/mole, water content about 0.02% (producer Lyondell)
Polyol (OH-value = 28.5): about 4000 g/mole, water content about 0.03% (producer Lyondell)
Mono-butylamine (producer Fluka)
Silane prepolymer see patent by Bayer: U.S. Pat. No. 5,364,955
Chalk Omya BLR2 (obtainable from Plüss-Stauffer)
UV-absorber Tinuvin 327 (producer Ciba Geigy)

The plasticizer migration was visually determined on white cement after 7 days at 23° C., 50% r.h.

PRODUCTION OF SEALANTS

Reference 2 and Examples 2A, 2B, 2C, and 2D

In Table 2 compositions and features of sealants (formulated with the thixotropic agents of the present invention) are listed in comparison to reference 2. The production was performed such that all components were compounded to a fine paste in a vacuum mixer. The sealant was filled into plastic cartridges using methods known in the art.

TABLE 2

Comparative Results for Sealants

| Parameter<br>Thixotropic agent | Ex. 2A<br>Ex. 1A | Ref. 2<br>Ref. 1 | Ex. 2B<br>Ex. 1B | Ex. 2C<br>Ex. 1C | Ex. 2D<br>Ex. 1D |
|---|---|---|---|---|---|
| Thixotropic agent [g] | 100 | 100 | 100 | 100 | 100 |
| Silane prepolymer [g] | 100 | 100 | 100 | 100 | 100 |
| Chalk [g] | 150 | 150 | 150 | 150 | 150 |
| Polyol (OH-value = 10.5) [g] | 60 | | 60 | | |
| Diisode-cylphthalate [g] | | 60 | | | |
| Polyol (OH-value = 56) [g] | | | | 60 | |
| Polyol (OH-value = 28.5) [g] | | | | | 60 |
| UV-absorber [g] | 1 | 1 | 1 | 1 | 1 |
| Dibutyltindi-laurate [g] | 2 | 2 | 2 | 2 | 2 |
| Homogeneity | very good | very good | bad | bad | bad |
| Extrusion force, fresh [Newton] | 900 | 600 | >3000 | ca. 1500 | ca. 1800 |
| Extrusion force, 1 week 60° C. | 1080 | 650 | not mea-surable | 2300 | 3400 |
| Plasticizer migra-tion | no | yes | no | no | no |
| Skin formation time [minutes] | 72 | 90 | 164 | 102 | 60 |
| Tensile strength [MPa] | 1.3 | 2 | 1 | 1 | 0.9 |
| Shore A hardness, 4 weeks RT | 16 | 17 | 18 | 15 | 17 |
| Shore A hardness, 4 weeks 90° C. | 25 | 18 | 35 | 33 | 30 |
| Storage stability, 4 weeks 60° C. | good | good | bad | bad | bad |

Example 3

Inventive Thixotropic Agent Produced in a Blocked Isocyanate Prepolymer 252.4 g fresh MDI-flakes were melted until clear in 747.6 g of a blocked prepolymer, produced from polyetherpolyol 2000, toluenediisocyanate and caprolactam, in a mixer, at about 60° C. under nitrogen and with slow stirring. With a mixer head and thereon following static mixer, a solution consisting of 147.6 g N-butylamine and 852.4 g of a blocked prepolymer were added, leading to the formation of the urea adduct. The reaction temperature did not exceed 100° C., and the reaction was so complete that by gas chromatography (GPC) or infrared spectroscopy (IR) no residual isocyanate monomer was found.

Example 4

Inventive Thixotropic Agent Produced in a Binder on Silane Basis 147.6 g N-butylamine in 854.2 g of the polyurethane hybride polymer according to U.S. Pat. No. 5,36,955 described in Example 2A, were homogenized in a mixer. 175.7 g 80/20 toluenediisocyanate and 824.3 g of a polypropylene-etherdiols (molecular weight about 12000) were mixed under nitrogen and cooling at about 15° C.

With a mixer head and thereon following static mixer, said two pre-mixtures were combined, leading to the formation of the urea adduct. The reaction was complete, so that by GPC or IR no residual isocyanate monomers could be detected.

Example 5

Inventive thixotropic agent produced from two solutions, whereby the MDI-flakes are dissolved in an acrylate groups comprising polymer and the amine compound is dissolved in a prepolymer on silane basis.

252.4 g MDI-flakes were melted in 747.6 g of a polymer comprising acrylate groups (reaction product of a hexaethylmethacrylate with an isophoron diisocyanate (IPDI)-prepolymer) at about 60° C. 147.6 g N-butylamine in 852.4 g of a polymer on silane basis were added under nitrogen and under stirring. The two pre-mixtures were combined by a static mixer in analogy to Example 4, whereafter the urea adduct was formed. The reaction was so complete that no residual isocyanate monomer could be detected by GPC.

While there are shown and described presently preferred embodiments of the invention, it is to be distinctly understood that the invention is not limited thereto but may be otherwise variously embodied and practised within the scope of the following claims.

What is claimed is:

1. A thixotropic agent based on at least one urea compound in a carrier material, wherein said carrier material is a non-diffusing carrier material.

2. The thixotropic agent of claim 1, wherein said non-diffusing carrier material is a reactive carrier material.

3. The thixotropic agent of claim 1, wherein said urea compound is the reaction product of an aromatic, monomeric diisocyanates with en aliphatic amine.

4. The thixotropic agent of claim 3, wherein said urea compound is the reaction product of 4,4'-diphenylmethylene diisocyante with butylamine.

5. The thixotropic agent of claim 1, wherein said urea compound is present in said carrier material in an amount of 5 to 50 wt-% based on the total weight of said urea compound end said carrier material.

6. The thixotropic agent of claim 5, wherein said urea compound is present in said carrier material in an amount of 16 to 30 wt.-% based on the total weight of said urea compound and said carrier material.

7. The thixotropic agent of claim 1, wherein said carrier material is a polyol with an OH-value of less than 28 mg KOH/g or a Mw per OH-group of greeter than 2000.

8. The thixotropic agent of claim 7, wherein said carrier material is a polyol with an OH-value of less than 10 mg KOH/g or a $M_w$ per OH-group of greater than 6000.

9. The thixotropic agent of claim 7, wherein said polyol is liquid at a temperature of about 20° C. to about 25° C.

10. The thixotropic agent of claim 1, wherein said carrier material is a prepolymer terminated with isocyanate groups.

11. The thixotropic agent of claim 1, wherein said carrier material is a prepolymer terminated with blocked isocyanate groups.

12. The thixotropic agent of claim 1, wherein said carrier material is a prepolymer terminated with silane groups.

13. The thixotropic agent of claim 12, wherein said carrier material is a polyurethane hybrid prepolymer terminated with silane groups.

14. The thixotropic agent of claim 1, wherein said carrier material is a mixture of carrier materials with the same or different reactivity.

15. The thixotropic agent of claim 14, wherein said carrier material is a combination of a prepolymer comprising acrylate groups with a prepolymer on silane basis.

16. A viscous at least one curable binder comprising system containing a thixotropic agent of claim 1.

17. The system of claim 16 additionally comprising at least one substance selected from the group consisting of fillers, plasticizers, adhesion promoting agents, catalysts, UV-stabilizers, usual additives, and mixtures of two or more of said substances.

18. The system of claim 16 additionally comprising a curing component.

19. A method for the production of a thixotropic agent of claim 1, wherein a diisocyanate monomer in a carrier material, and an amine component in a carrier material are mixed and reacted.

20. The system of claim 18, wherein said curing component is a latent curing agent that can be activated by humidity and/or heat.

* * * * *